(12) United States Patent
Bergeron (10) Patent No.: US 11,502,932 B2
(45) Date of Patent: Nov. 15, 2022

(54) INDIRECT TESTING USING IMPAIRMENT RULES

(71) Applicant: Keysight Technologies, Inc., Santa Rosa, CA (US)

(72) Inventor: Matthew R. Bergeron, Sunol, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 266 days.

(21) Appl. No.: 16/415,790

(22) Filed: May 17, 2019

(65) Prior Publication Data

US 2020/0366588 A1      Nov. 19, 2020

(51) Int. Cl.
*H04L 12/26*     (2006.01)
*H04L 43/50*     (2022.01)
*H04L 43/065*    (2022.01)
*H04L 43/12*     (2022.01)

(52) U.S. Cl.
CPC ............ *H04L 43/50* (2013.01); *H04L 43/065* (2013.01); *H04L 43/12* (2013.01)

(58) Field of Classification Search
USPC ....................................................... 370/241
See application file for complete search history.

(56) References Cited

U.S. PATENT DOCUMENTS

| | | |
|---|---|---|
| 6,246,684 B1 | 6/2001 | Chapman et al. |
| 6,625,689 B2 | 9/2003 | Narad et al. |
| 6,717,917 B1 | 4/2004 | Weissberger et al. |
| 6,920,120 B2 | 7/2005 | Huang |
| 7,069,490 B2 | 6/2006 | Niu et al. |
| 7,215,680 B2 | 5/2007 | Mullendore et al. |
| 7,233,573 B2 | 6/2007 | Walls et al. |
| 7,593,345 B2 | 9/2009 | Dubé et al. |
| 7,633,939 B2 | 12/2009 | Curran-Gray et al. |

(Continued)

FOREIGN PATENT DOCUMENTS

| | | |
|---|---|---|
| CN | 101631080 A | 1/2010 |
| CN | 101854268 A | 10/2010 |

(Continued)

OTHER PUBLICATIONS

Network Functions Virtualization (NFV); Assurance; Report on Active Monitoring and Failure Detection, ETSI, 62 pages (Year: 2015).*

(Continued)

*Primary Examiner* — Christopher M Crutchfield
*Assistant Examiner* — Jean F Voltaire (57) ABSTRACT

According to one method, the method occurs at a first test device located inline between at least one traffic source and a network and/or system under test (NSUT), wherein the first test device is implemented using at least one processor and at least one memory. The method includes receiving, from a test controller, impairment rules generated from baseline metrics based on monitored live traffic for effecting traffic impairments; receiving traffic destined to the NSUT; impairing the traffic destined to the NSUT based on the impairment rules; sending the impaired traffic towards the NSUT, wherein the NSUT processes the impaired traffic; and sending, from the test device or a related tap, response information from the NSUT to the test controller for analyzing NSUT performance.

20 Claims, 4 Drawing Sheets

(56) References Cited

U.S. PATENT DOCUMENTS

| | | |
|---|---|---|
| 7,751,449 B2 | 7/2010 | Winters |
| 8,040,908 B2 | 10/2011 | Choi et al. |
| 8,135,024 B2 | 3/2012 | Abel et al. |
| 8,520,529 B2 | 8/2013 | Hutchison et al. |
| 8,711,705 B1 | 4/2014 | Johnson et al. |
| 9,065,770 B2 | 6/2015 | Chew et al. |
| 9,088,520 B2 | 7/2015 | Hutchison et al. |
| 9,288,777 B2 | 3/2016 | Hollabaugh et al. |
| 9,300,565 B2 | 3/2016 | Robitaille et al. |
| 9,614,689 B2 | 4/2017 | Cook et al. |
| 9,628,339 B1 | 4/2017 | Thai et al. |
| 9,819,553 B2 | 11/2017 | Robitaille et al. |
| 9,971,620 B2 | 5/2018 | Karnes |
| 10,181,912 B1 | 1/2019 | Callaghan et al. |
| 10,425,321 B2 | 9/2019 | Joseph et al. |
| 10,609,054 B2 | 3/2020 | Jackson |
| 10,880,019 B1 | 12/2020 | Mestre Adrover et al. |
| 11,258,719 B1 | 2/2022 | Sommers |
| 11,388,081 B1 | 7/2022 | Sommers et al. |
| 2002/0093917 A1 | 7/2002 | Knobbe et al. |
| 2005/0041592 A1* | 2/2005 | Hannel ............... H04L 41/145 370/241 |
| 2006/0088060 A1 | 4/2006 | Fujikami et al. |
| 2006/0109796 A1 | 5/2006 | Koptiw et al. |
| 2006/0212633 A1 | 9/2006 | Kasper |
| 2006/0256720 A1 | 11/2006 | Curran-Gray et al. |
| 2007/0230493 A1 | 10/2007 | Dravida et al. |
| 2008/0069002 A1 | 3/2008 | Savoor et al. |
| 2008/0168064 A1 | 7/2008 | Dorsey |
| 2009/0003207 A1 | 1/2009 | Elliott |
| 2009/0116397 A1 | 5/2009 | Denby et al. |
| 2009/0207732 A1 | 8/2009 | Rogers |
| 2009/0207752 A1 | 8/2009 | Bugenhagen |
| 2010/0046520 A1 | 2/2010 | Nakata |
| 2010/0195659 A1 | 8/2010 | Karaoguz et al. |
| 2011/0069745 A1 | 3/2011 | Thompson et al. |
| 2012/0008760 A1 | 1/2012 | Berkowitz et al. |
| 2012/0314704 A1 | 12/2012 | Karaoguz et al. |
| 2013/0058230 A1 | 3/2013 | Wvong et al. |
| 2013/0064095 A1 | 3/2013 | Chew et al. |
| 2013/0070584 A1 | 3/2013 | Hutchison et al. |
| 2013/0070777 A1 | 3/2013 | Hutchison et al. |
| 2013/0086250 A1 | 4/2013 | Eskicioglu et al. |
| 2013/0170507 A1 | 7/2013 | Hsueh et al. |
| 2014/0181611 A1 | 6/2014 | Currivan et al. |
| 2014/0258781 A1 | 10/2014 | Cook |
| 2014/0304505 A1 | 10/2014 | Dawson |
| 2015/0103828 A1 | 4/2015 | Chandhoke et al. |
| 2015/0103832 A1 | 4/2015 | Chandhoke et al. |
| 2015/0103836 A1 | 4/2015 | Chandhoke et al. |
| 2015/0103848 A1 | 4/2015 | Chandhoke et al. |
| 2015/0245306 A1 | 8/2015 | Boehlke |
| 2016/0065434 A1 | 3/2016 | Janakiraman |
| 2016/0110212 A1 | 4/2016 | Karnes |
| 2017/0180233 A1* | 6/2017 | Nistor ............... H04L 41/12 |
| 2017/0180238 A1* | 6/2017 | Telle ............... G06F 11/3664 |
| 2017/0214703 A1 | 7/2017 | Tekchandani |
| 2017/0331748 A1 | 11/2017 | Mangin |
| 2017/0364794 A1 | 12/2017 | Mahkonen et al. |
| 2018/0041399 A1 | 2/2018 | Robitaille et al. |
| 2018/0070373 A1 | 3/2018 | Muench |
| 2018/0106702 A1* | 4/2018 | Fattu ............... H01R 27/02 |
| 2018/0160424 A1 | 6/2018 | Cavalcanti et al. |
| 2018/0184438 A1 | 6/2018 | Cavalcanti et al. |
| 2018/0191642 A1 | 7/2018 | Biederman et al. |
| 2018/0227067 A1 | 8/2018 | Hu et al. |
| 2018/0237039 A1 | 8/2018 | Mong et al. |
| 2018/0295144 A1 | 10/2018 | Jackson |
| 2018/0302330 A1 | 10/2018 | Bush |
| 2018/0302331 A1 | 10/2018 | Bush |
| 2018/0309655 A1 | 10/2018 | Joseph et al. |
| 2019/0140893 A1 | 5/2019 | Artzi et al. |
| 2019/0222481 A1* | 7/2019 | Hira ............... H04L 41/0853 |
| 2019/0354406 A1 | 11/2019 | Ganguli et al. |
| 2019/0386924 A1 | 12/2019 | Srinivasan et al. |
| 2020/0067792 A1 | 2/2020 | Aktas et al. |
| 2020/0112487 A1 | 4/2020 | Inamdar et al. |
| 2020/0120029 A1 | 4/2020 | Sankaran et al. |
| 2020/0296023 A1* | 9/2020 | Kumar ............... H04L 43/103 |
| 2020/0313999 A1 | 10/2020 | Lee et al. |
| 2020/0326971 A1 | 10/2020 | Yang |
| 2020/0366608 A1 | 11/2020 | Pan et al. |
| 2021/0112002 A1 | 4/2021 | Pan et al. |
| 2022/0014457 A1 | 1/2022 | Liu |
| 2022/0060422 A1 | 2/2022 | Sommers |

FOREIGN PATENT DOCUMENTS

| | | |
|---|---|---|
| CN | 108737003 A | 11/2018 |
| CN | 108737003 B | 10/2021 |
| DE | 10 2018 109 689 A1 | 10/2018 |
| WO | 2021015802 A1 | 1/2021 |

OTHER PUBLICATIONS

Network Functions Virtualization (NFV); Assurance; Report on Active Monitoring and Failure Detection, ETSI, 62 pages (Year: 2015) (Year: 2015).*

Commonly-Assigned, co-pending U.S. Appl. No. 17/001,614 for "Methods, Systems and Computer Readable Media for Network Congestion Control Tuning," (Unpublished, filed Aug. 24, 2020).

Beltman et al., "Collecting telemetry data using P4 and RDMA," University of Amsterdam, pp. 1-12 (2020).

Liu et al., "HPCC++: Enhanced High Precision Congestion Control," Network Working Group, pp. 1-15 (Jun. 17, 2020).

"Traffic Management User Guide (QFX Series and EX4600 Switches)," Juniper Networks, pp. 1-1121 (Mar. 18, 2020).

"H3C S6850 Series Data Center Switches," New H3C Technologies Co., Limited, pp. 1-13 (Mar. 2020).

Even et al., "Data Center Fast Congestion Management," pp. 1-15 (Oct. 23, 2019).

Li et al., "HPCC: High Precision Congestion Control," SIGCOMM '19, pp. 1-15 (Aug. 19-23, 2019).

"RoCE Congestion Control Interoperability Perception vs. Reality," Broadcom White Paper, pp. 1-8 (Jul. 23, 2019).

"What is RDMA?," Mellanox, pp. 1-3 (Apr. 7, 2019).

Geng et al., "P4QCN: Congestion Control Using P4-Capable Device in Data Center Networks," Electronics, vol. 8, No. 280, pp. 1-17 (Mar. 2, 2019).

Mandal, "In-band Network Telemetry—More Insight into the Network," Ixia, https://www.ixiacom.com/company/blog/band-network-telemetry-more-insight-network, pp. 1-9 (Mar. 1, 2019).

"Understanding DC-QCN Algorithm for RoCE Congestion Control," Mellanox, pp. 1-4 (Dec. 5, 2018).

"Understanding RoCEv2 Congestion Management," Mellanox, https://community.mellanox.com/s/article/understanding-rocev2-congestion-management, pp. 1-6 (Dec. 3, 2018).

"Data Center Quantized Congestion Notification (DCQCN)," Juniper Networks, pp. 1-7 (Oct. 4, 2018).

Mittal et al., "Revisiting Network Support for RDMA," SIGCOMM '18, pp. 1-14 (Aug. 20-25, 2018).

Varadhan et al., "Validating ROCEV2 in the Cloud Datacenter," OpenFabrics Alliance, 13th Annual Workshop 2017, pp. 1-17 (Mar. 31, 2017).

Zhu et al., "ECN or Delay: Lessons Learnt from Analysis of DCQCN and TIMELY," CoNEXT '16, pp. 1-15 (Dec. 12-15, 2016).

Kim et al., "In-band Network Telemetry (INT)," pp. 1-28 (Jun. 2016).

Kim et al., "In-band Network Telemetry via Programmable Dataplanes," pp. 1-2 (2015).

Zhu et al., "Congestion Control for Large-Scale RDMA Deployments," SIGCOMM '15, pp. 1-14 (Aug. 17-21, 2015).

Mittal et al., "TIMELY: RTT-based Congestion Control for the Datacenter," SIGCOMM '15, pp. 1-14 (Aug. 17-21, 2015).

Zhu et al., "Packet-Level Telemetry in Large Datacenter Networks," SIGCOMM '15, pp. 1-13 (Aug. 17-21, 2015).

"RoCE in the Data Center," Mellanox Technologies, White Paper, pp. 1-3 (Oct. 2014).

(56) References Cited

OTHER PUBLICATIONS

Barak, "Introduction to Remote Direct Memory Access (RDMA)," http://www.rdmamojo.com/2014/03/31/remote-direct-memory-access-rdma/, pp. 1-14 (Mar. 31, 2014).
"Quick Concepts Part 1—Introduction to RDMA," ZCopy, Education and Sample Code for RDMA Programming, pp. 1-5 (Oct. 8, 2010).
Mizadeh et al., "Data Center TCP (DCTCP)," SIGCOMM '10, pp. 1-12 (Aug. 30-Sep. 3, 2010).
Grochla, "Simulation comparison of active queue management algorithms in TCP/IP networks," Telecommunication Systems, pp. 1-9 (Oct. 2008).
Notice of Allowance and Fee(s) Due for U.S. Appl. No. 15/498,452 (dated May 10, 2019).
Final Office Action for U.S. Appl. No. 15/482,672 (dated Apr. 2, 2019).
"Principles of Chaos Engineering", https://principlesofchaos.org/, pp. 1-2 (May 2018).
Non-Final Office Action for U.S. Appl. No. 15/482,672 (dated Nov. 16, 2018).
Moussa et al., "A Detection and Mitigation Model for PTP Delay Attack in an IEC 61850 Substation", IEEE Transactions on Smart Grid, vol. 9, No. 5, pp. 3954-3965 (Sep. 2018).
"Time-Sensitive Networking Task," Wikipedia, the free encyclopedia, https://en.wikipedia.org/wiki/Time-Sensitive_Networking, pp. 1-7 (Aug. 29, 2017).
Teener, "IEEE 802 Time-Sensitive Networking: Extending Beyond AVB," Accessed on wayback machine, https://web.archive.org/web/20140724130142/http://standards.ieee.org/events/automotive/08_Teener_TSN.pdf, pp. 1-30 (Jul. 24, 2017).
"IEEE Standard for Local and metropolitan area networks—Bridges and Bridged Networks—Amendment 29: Cyclic Queuing and Forwarding," IEEE Computer Society, IEEE Std 802.1QchTM-2017, pp. 1-28 (May 18, 2017).
Commonly-Assigned, co-pending U.S. Appl. No. 15/498,452 for "Methods, Systems and Computer Readable Media for Testing Time Sensitive Network (TSN) Elements," (Unpublished, filed Apr. 26, 2017).
Commonly-Assigned, co-pending U.S. Appl. No. 15/482,672 for "Methods, Systems, and Computer Readable Media for Monitoring, Adjusting, and Utilizing Latency Associated With Accessing Distributed Computing Resources," (Unpublished, filed Apr. 7, 2017).
"IEEE Standard for Local and metropolitan area networks—Bridges and Bridged Networks—Amendment 26: Frame Preemption," IEEE Computer Society, IEEE Std 802.1QbuTM-2016, pp. 1-51 (Jun. 30, 2016).
"IEEE Standard for Local and metropolitan area networks—Bridges and Bridged Networks—Amendment 25: Enhancements for Scheduled Traffic," IEEE Computer Society, IEEE Std 802.1QbvTM-2015, pp. 1-55 (Dec. 5, 2015).
"External Bypass Switches," Ixia, White Paper, 915-6688-01 Rev. B, pp. 1-5 (Dec. 2015).
"IEEE Standard for Local and metropolitan area networks—Bridges and Bridged Networks—Amendment 24: Path Control and Reservation," IEEE Computer Society, IEEE Std 802.1QcaTM-2015, pp. 1-105 (Sep. 3, 2015).
Finn, "802.1Qav + P802.1Qbv Time-gated Shapers," Cisco System, IEEE 802 Pleanry, pp. 1-12 (Nov. 5, 2014).
Boiger, "Deterministic Ethernet—IEEE 802.1 standards for real-time process control, industrial automation, and vehicular networks," IEEE 802 Tutorial, pp. 1-72 (Nov. 12, 2012).
Boiger, "Time Aware Shaper," Deggendorf University of Applied Sciences, IEEE 802.1 Pleanry, pp. 1-12 (Sep. 2012).
Spirent, "Precision Time Protocol (PTP) IEEE 1588," YouTube "alantalkstech", https://www.youtube.com/watch?v=yw-gd01aOYg, pp. 1-11 (Dec. 7, 2011).
"IEEE Standard for Local and metropolitan area networks—Timing and Synchronization for Time-Sensitive Applications in Bridged Local Area Networks," IEEE Computer Society, IEEE Std 802.1ASTM-2011, pp. 1-274 (Mar. 30, 2011).

Eidson, "IEEE-1588 Standard for a Precision Clock Synchronization Protocol for Networked Measurement and Control Systems—A Tutorial," Agilent Technologies, pp. 1-94 (Oct. 2005).
Non-Final Office Action for U.S. Appl. No. 15/498,452 (dated Nov. 5, 2018).
Notice of Allowance and Fee(s) Due and Examiner-Initiated Interview Summary for U.S. Appl. No. 15/482,672 (dated Dec. 18, 2019).
Non-Final Office Action for U.S. Appl. No. 15/482,672 (dated Jun. 14, 2019).
Extended European Search Report for European Application Serial No. 19202282.0 (dated Apr. 7, 2020).
"Network Functions Virtualization (NFV); Assurance; Report on Active Monitoring and Failure Detection," Draft ETSI GS NFV-REL004, V0.1.1, pp. 1-62 (Jul. 2015).
Notice of Allowance and Fee(s) Due and Examiner-Initiated Interview Summary for U.S. Appl. No. 13/627,325 (dated Mar. 20, 2015).
Non-Final Office Action and Examiner-Initiated Interview Summary for U.S. Appl. No. 13/627,325 (dated Oct. 2, 2014).
Notice of Allowance and Fee(s) Due for U.S. Appl. No. 13/234,060 (dated Jul. 24, 2013).
Applicant-Initiated Interview Summary for U.S. Appl. No. 13/234,060 (dated Jul. 19, 2013).
Non-Final Office Action for U.S. Appl. No. 13/234,060 (dated Apr. 16, 2013).
"SPIRENT GEM Ethernet Network Impairment Emulators, Network Playback Module for CES, TOP, MEF-18, G.8261," Spirent Communications, http://www.spirent.co/~media/Datasheets/Broadband/PAB/GEM_Impairments/GEM_NW_Piayback_Module_for_CES_TOP_ MEF-18_G8261_Datasheet.pdf, 4 pages (accessed Jan. 17, 2012.).
"Spirent XGEM 10Gigabit Ethernet Multi-Profile Network and Impairment Emulator V3.1," User Guide, Spirent Communications, XP-002693593, pp. 1-211 (Mar. 2009).
Non-Final Office Action for U.S. Appl. No. 17/001,614 (dated Apr. 23, 2021).
First Office Action for Chinese Patent Application No. 201810373217.5 (dated Feb. 2, 2021).
Advisory Action for U.S. Appl. No. 16/258,485 (dated Nov. 19, 2020).
Parry et al., "A Network Forensics Tool for Precise Data Packet Capture and Replay in Cyber-Physical Systems," ACSW '16 Multiconference, pp. 1-10 (Feb. 2-5, 2016).
Notice of Allowance and Fee(s) Due for Chinese Patent Application No. 201810373215.5 (dated Aug. 18, 2021).
Notice of Allowance and Fee(s) Due for U.S. Appl. No. 17/001,614 (dated Sep. 29, 2021).
Commonly-Assigned, co-pending U.S. Appl. No. 17/319,872 for "Methods, Systemsand Computer Readable Media for Stateless Service Traffic Generation," (Unpublished, filed May 13, 2021).
"Albedo Net.Storm," NETSTORM.en, pp. 1-4 (2014).
"Datasheet—Albedo NetStorm," Albedo Telecom, pp. 1-2 (Dec. 23, 2015).
Cao et al., "TurboNet: Faithfully Emulating Networks with Programmable Switches," IEEE, pp. 1-11 (2020).
"Chimera Network Impairment Emulator," Xena Networks, pp. 1-2 (2021).
"Ethernet Network Emulator," MGA2510 Product Brief, Aukua Systems, pp. 1-2 (2021).
"Spirent Network Emulator," Spirent Communications, pp. 1-11 (Apr. 2021).
"Agilent E4219A ATM Network Impairment Emulator," Keysight, pp. 1-5 (2021).
Spirent Communications, "Cloud Computing Testing," pp. 1-10 (Apr. 2010).
"TekExpress USB 3.0 (USB-RMT) Automated Receiver Compliance and Margin Test Solutions," Tektronix, pp. 1-154 (2021).
"QSFP DD Loopback Modules," High Speed IO, Amphenol ICC, pp. 1-2 (2021).
Sultana et al., "Flightplan Dataplane Disaggregation and Placement for P4 Programs," 18th {USENIX} Symposium on Networked Systems Design and Implementation, pp. 1-22 (2021).

(56) References Cited

OTHER PUBLICATIONS

"Network Emulator II—Ethernet 10GE, 1GE, and 100MbE Ethernet Impairment Emulation," Keysight Technologies, pp. 1-8 (Oct. 22, 2020).

Chen et al., "Data Center Congestion Management requirements," https://tools.ietf.org/id/draft-yueven-tsvwg-dccm-requirements-01.html, pp. 1-7 (Jul. 2019).

"The Value of Network Impairment Testing in Power Grids," Calnex SNE, pp. 1-2 (2006).

Non-Final Office Action for U.S. Appl. No. 17/319,872 (dated Aug. 2, 2022).

Office Action for European Patent Application Serial No. 19202282.0 (dated Apr. 20, 2022).

* cited by examiner

INDIRECT TESTING USING IMPAIRMENT RULES

TECHNICAL FIELD

The subject matter described herein relates to testing devices. More specifically, the subject matter relates to methods, systems, and computer readable media for indirect testing using impairment rules.

BACKGROUND

Chaos engineering is the discipline of experimenting on a distributed system in order to build confidence in the system's capability to withstand turbulent conditions in production. Advances in large-scale, distributed software systems are changing the game for software engineering. For example, even when all of the individual services in a distributed system are functioning properly, the interactions between those services can cause unpredictable outcomes. Unpredictable outcomes, compounded by rare but disruptive real-world events that affect production environments, make these distributed systems inherently chaotic.

Identifying weaknesses before they become system-wide, aberrant behaviors can be very useful for ensuring good performance and user experience. Some systemic weaknesses may include: improper fallback settings when a service is unavailable; retry storms from improperly tuned timeouts; outages when a downstream dependency receives too much traffic; cascading failures when a single point of failure crashes; etc. While some test operators may generate predefined tests for identifying weaknesses in complex and/or distributed systems, predefined tests may be incapable or inefficient at testing various real-world conditions, e.g., unpredictable or rare production environment issues and the ensuing interactions between system components and/or traffic caused by such issues.

Accordingly, in light of these difficulties, a need exists for methods, systems, and computer readable media for indirect testing using impairment rules.

SUMMARY

Methods, systems, and computer readable media for indirect testing using impairment rules are disclosed. According to one method, the method occurs at a first test device located inline between at least one traffic source and a network and/or system under test (NSUT), wherein the first test device is implemented using at least one processor and at least one memory. The method includes receiving, from a test controller, impairment rules generated from baseline metrics based on monitored live traffic for effecting traffic impairments; receiving traffic destined to the NSUT; impairing the traffic destined to the NSUT based on the impairment rules; sending the impaired traffic towards the NSUT, wherein the NSUT processes the impaired traffic; and sending, from the test device or a related tap, response information from the NSUT to the test controller for analyzing NSUT performance.

According to one system, the system includes a first test device. The first test device located inline between at least one traffic source and a network and/or system under test (NSUT), wherein the first test device is implemented using at least one processor and at least one memory. The first test device is configured for: receiving, from a test controller, impairment rules generated from baseline metrics based on monitored live traffic for effecting traffic impairments; receiving traffic destined to the NSUT; impairing the traffic destined to the NSUT based on the impairment rules; sending the impaired traffic towards the NSUT, wherein the NSUT processes the impaired traffic; and sending, from the test device or a related tap, response information from the NSUT to the test controller for analyzing NSUT performance.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, each of the terms "function" and "module" refers to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for indirect testing using impairment rules. When testing one or more network nodes, it may be desirable to test network(s) and/or system (s) under test (NSUT) by testing performance of the NSUT using artificially impaired live or real-world traffic.

In accordance with some aspects of the subject matter described herein, techniques, methods, and systems for indirect testing of an NSUT using impairment rules are disclosed. For example, a test system may be configured to perform tests on a NSUT using live traffic. In this example, a bypass switch and/or other entity associated with the test system may be configured to observe live traffic and provide packet copies, packet metrics, or both to the test system. The test system may be configured to use the live traffic and/or related data to generate a baseline behavior profile for the NSUT. Using knowledge about the NSUT's normal behavior and/or information from a test operator, the test system may be configured to generate impairment rules for impairing live traffic and to instruct one or more test related entities (e.g., a physical device or test software executing on a processor) for testing NSUT by impairing live traffic using the impairment rules. The test system or a related entity may be configured to monitor how the NSUT handles the impaired live traffic by receiving traffic and/or related data from the NSUT and comparing the received information to the baseline behavior profile or to an expected behavior profile derived from the baseline behavior profile from the network.

In accordance with some aspects of the subject matter described herein, indirect testing may be facilitated by instrumenting live traffic such that test analysis can more easily analyze response traffic from a NSUT. For example, a test system or a related entity may modify header values (e.g., a test flag, a test sequence number or a test session and/or flow identifier) or add attribute value pairs (AVPs) for testing purposes to live application traffic, e.g., when the live application traffic is being impaired using impairment rules. In this example, the traffic instrumentation may be useful for efficiently identifying issues, such as latency or jitter. Further, such modifications may mark traffic (e.g., packets) egressing the NSUT such that a probe can quickly identify traffic that is to be copied and sent to the test system for analysis.

Reference will now be made in detail to example embodiments of the subject matter described herein, examples of which are illustrated in the accompanying drawings. Wherever possible, the same reference numbers will be used throughout the drawings to refer to the same or like parts.

Figure 1:
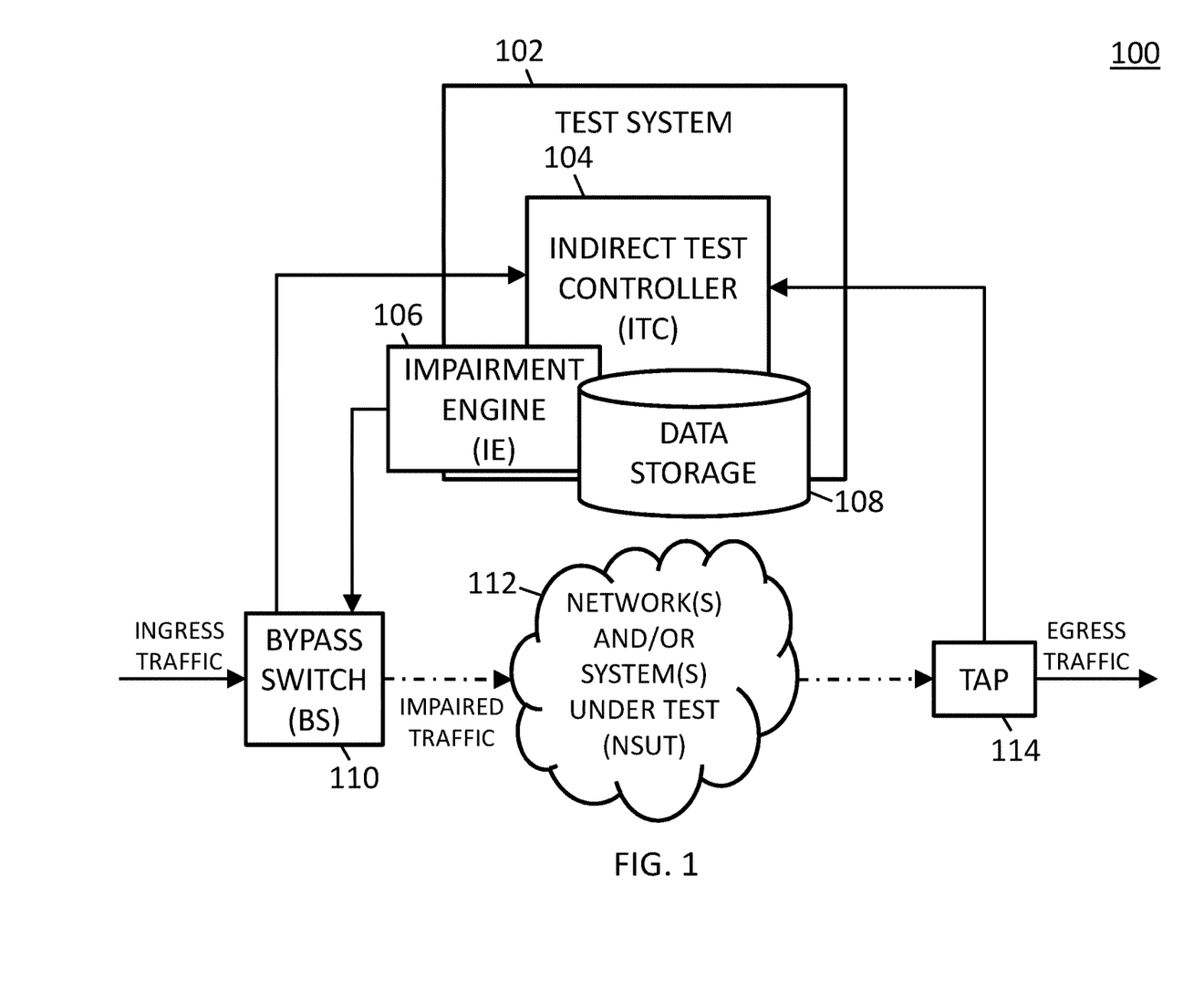
FIG. 1 is a diagram illustrating an example test environment for indirect testing using impairment rules.

FIG. 1 is a diagram illustrating an example test environment 100 for indirect testing using impairment rules. Referring to FIG. 1, an example environment 100 may include test system 102 and one or more network(s) and/or system(s) under test (NSUT) 112. Test system 102 may represent any suitable entity or entities (e.g., one or more computing platforms, nodes, or devices) associated with testing NSUT 112 (e.g., one or more security devices). For example, test system 102 may generate and send impairment rules to various nodes for indirectly testing to NSUT 112 and/or receive traffic or related data from NSUT 112 and may analyze one or more performance aspects associated with NSUT 112.

NSUT 112 may be any suitable entity or entities (e.g., network of devices, systems, or platforms) for receiving, processing, forwarding, and/or sending one or more messages (e.g., packets, API requests, etc.). In some embodiments, NSUT 112 may include network nodes (e.g., a network switch, a network router, a network interface card, a packet forwarding device), application servers, virtual machines (VMs), and/or devices. In some embodiments, NSUT 112 may include a local area network (LAN) or wide area network (WAN), e.g., a service provider network or enterprise network containing multiple nodes or devices. In some embodiments, NSUT 112 may include a cloud-based network of VNFs and/or other nodes.

In some embodiments, test system 102 may include a stand-alone tool, a testing device, a test device or platform, or software executing on one or more processor(s). In some embodiments, test system 102 may be a single device or node or may be distributed across multiple devices or nodes. In some embodiments, test system 102 may include one or more modules for performing various test related functions. For example, test system 102 may include a baseline module for generating a baseline or normal behavior profile for NSUT 112 and/or a correlation or analyze module for analyzing data from NSUT 112 to determine NSUT performance or related test results.

Test system 102 may include or interact with an indirect test controller (ITC) 104, an impairment engine (IE) 106, a data storage 108, a bypass switch (BS) 110, and a tap 114. ITC 104 may be any suitable entity or entities (e.g., software executing on a processor, a field-programmable gateway array (FPGA), and/or an application-specific integrated circuit (ASIC), or a combination of software, an FPGA, and/or an ASIC) for performing one or more aspects associated with controlling, configuring, and/or initiating testing of NSUT 112 or various aspects thereof. In some embodiments, ITC 104 may be implemented using one or more processors and/or memory. For example, ITC 104 may utilize one or more processors (e.g., executing software stored in memory) to generate one or more baseline behavior profiles for NSUT 112 based on monitored traffic associated with NSUT 112. In another example, ITC 104 may also utilize one or more processors to generate impairment rules for impairing traffic that is to traverse NSUT 112 based on a baseline behavior profile and to initiate various tests and/or analyses involving impaired traffic and/or related responses from NSUT 112. In this example, ITC 104 may send instructions to various modules or entities in test system 102 for controlling (e.g., modify, pause, restart, or stop) a test session.

BS 110 may be any suitable entities (e.g., a monitoring device, software executing on a processor, etc.) for sending and/or receiving traffic sent to or through NSUT 112. In some embodiments, BS 110 may be configured for sending and/or diverting live traffic to IE 106. In this example, IE 106 may modify or impair the traffic received from BS 110 and then send the impaired traffic back to BS 110 where BS 110 sends the impaired traffic onward to or through NSUT 112.

IE 106 may be any suitable entity or entities (e.g., software executing on a processor, an ASIC, an FPGA, or a combination of software, an ASIC, and/or an FPGA) for performing one or more aspects associated with indirect testing, e.g., testing using a network's own traffic or an impaired version thereof. For example, IE 106 may be configured for receiving impairment rules from ITC 104, impairing live traffic destined for NSUT 112 using the impairment rules, monitoring relevant traffic to or from NSUT 112, sending relevant traffic or related information to ITC 104 or related entities, and/or other aspects associated with testing NSUT 112. In some embodiments, IE 106 may be implemented using a computing platform (e.g., a computer or a mobile device) using one or more processors and/or memory. For example, IE 106 may utilize one or more processors (e.g., executing software stored in memory) to impair live traffic using impairment rules.

In some embodiments, IE 106 may be located inline with NSUT 112, e.g., IE 106 may be located between at least one traffic source and NSUT 112. For example, BS 110 may divert network traffic to IE 106, IE 106 may impair at least some of the traffic using relevant impairment rules (e.g., received from ITC 104); and IE 106 may then send the network traffic, including the impaired traffic, onward to NSUT 112 via BS 110.

In some embodiments, IE 106 may communicate with test system 102 and/or other related entities (e.g., ITC 104) to receive test configuration information usable to set up and/or execute one or more test sessions. For example, test configuration information may include a script for impairing, marking, and sending particular traffic and/or flows to test participants. In this example, test configuration information may include a set of impairment rules and/or an impairment test schedule or test execution window.

In some embodiments, IE 106 may apply traffic impairments based on impairments rules and/or related test configuration information. For example, ITC 104 may instruct IE 106 to apply an impairment rule that impairs all traffic from a particular service provider or a particular application such that the traffic has increased latency of 200%. In this example, IE 106 may artificially introduce the required latency into one or more flows that are traversing IE 106 destined for NSUT 112.

In some embodiments, ITC 104 may instruct IE 106 to apply an impairment rule that impairs some traffic from a particular user such that the traffic appears to arrive out of order or corrupted. For example, IE 106 may introduce the required impairment by modifying packet headers or by buffering packets and transmitting, out of order, the packets of one or more flows that are traversing IE 106 destined for NSUT 112.

In another example, ITC 104 may instruct IE 106 to apply an impairment rule that impairs traffic pseudo-randomly such that a drop ratio associated with a link increasing by 70%. In this example, IE 106 may introduce the required impairment by dropping or discarding packets of one or more flows that are traversing IE 106 destined for NSUT 112.

In some embodiments, IE 106 may be configured to mark or instrument live traffic. For example, when impairing live traffic, IE 106 may also add or modify header values (e.g., a test flag, a test sequence number or a test session and/or flow identifier) or insert a test related AVP into the traffic. In this example, the marking or instrumenting of the impaired traffic may be usable by tap 114 and/or test related entities downstream to identify relevant packets and/or to identify issues.

Tap 114 may be any suitable entities (e.g., a monitoring device, software executing on a processor, etc.) for monitoring and/or copying data that traversing a physical link, a virtual link, or a node (e.g., NSUT 112). For example, tap 114 may be a network tap associated with a link or node that copies messages or portions thereof. In another example, tap 114 may be monitoring software executing on a network node or switch located in NSUT 112 or downstream from NSUT 112.

In some embodiments, tap 114 may be configured to identify and copy relevant messages or data therein based on an 'impaired packet' header flag or parameter, a test related AVP, inline telemetry information, or other identifying information. In this example, tap 114 may store copied data (e.g., in data storage 108) and/or may forward copied data to relevant entities (e.g., ITC 104).

In some embodiments, ITC 104, tap 114, and/or IE 106 may include one or more communications interfaces (e.g., one or more receive port modules and one or more transmit port modules) for interacting with users, modules, and/or nodes. For example, communications interfaces may include network interface cards (NICs) or other suitable hardware, firmware, and/or software for receiving or transmitting data via ports (e.g., physical or logical communication end points).

In some embodiments, test system 102 and/or related entities may include or provide a communications interface for communicating with a test operator. In such embodiments, the test operator may be any entity (e.g., an automated system or a device or system controlled or controllable by a human user) for selecting and/or configuring various aspects associated with testing and/or generating testing related metrics. For example, user interfaces (e.g., an API and a graphical user interface (GUI)) may be provided for inputting or modifying configuration information, such as tests to be performed, types of metrics or statistics to be generated, and/or other settings.

In some embodiments, one or more user interfaces at test system 102 may support automation, e.g., via a representation state transfer (REST) API, a command line, and/or a web-based GUI. For example, a test operator may use a web browser to interact with a web-based GUI at ITC 104 or IE 106 for programming or configuring one or more aspects for testing NSUT 112.

In some embodiments, ITC 104, tap 114, IE 106, and/or other entities in test system 102 may include functionality for accessing data storage 108 or other memory. Data storage 108 may be any suitable entity or entities (e.g., a storage device, memory, a non-transitory computer readable medium, or a storage system) for maintaining or storing information related to testing. For example, data storage 108 may store baseline behavior profiles, expected test performance profiles, impairment rules, impairment scheduling information, and message capture related information, e.g., time delta information, timestamp related data, and/or other information. In this example, message capture related information may be usable to determine, derive, or compute one or more test related statistics or metrics, such as one-way latency, round trip latency, session timeout, connection attempts, inter-switch latency, and/or hop counts.

In some embodiments, data storage 108 may also contain information usable for generating statistics and/or metrics associated with one or more aspects of NSUT 112. For example, data storage 108 may contain metrics associated with one or more performance aspects of NSUT 112 during one or more test scenarios. In this example, data storage 108 may maintain a particular set of computed metrics for a first test session and may maintain another set of computed metrics for a second test session. In some embodiments, data storage 108 and/or memory may be located at test system 102, another node, or distributed across multiple platforms or devices.

In some embodiments, test system 102 or one or more entities therein (e.g., ITC 104 and/or IE 106) may be configured for performing tests on a NSUT 112 using live traffic. For example, BS 110 may be configured to observe live traffic and provide packet copies, packet metrics, or both to ITC 104. ITC 104 may be configured to use the live traffic and/or related data to generate a baseline behavior profile for NSUT 112. Using knowledge about the NSUT's traffic and/or information from a test operator, ITC 104 may be configured to generate impairment rules for impairing live traffic and to instruct one or more test related entities (e.g., a physical device or test software in the network being tested) for testing NSUT 112 by impairing live traffic using the impairment rules. ITC 104 or a related entity may be configured to monitor how the NSUT handles the impaired live traffic by receiving traffic from NSUT 112 and comparing the received traffic to an expected output or a baseline from the network (e.g., determined before testing).

In some embodiments, indirect testing may be facilitated by instrumenting live traffic such that test analysis can more easily analyze relevant response traffic from a NSUT. For example, a test system or a related entity may modify header values (e.g., a test flag, a test sequence number or a test session and/or flow identifier) or add test related AVPs to live application traffic, e.g., when the live application traffic is being impaired using impairment rules. In this example, the traffic instrumentation may be useful for efficiently identifying issues, such as latency or jitter. Further, such modifications may mark traffic (e.g., packets) egressing the NSUT such that a probe can quickly identify traffic that is to be copied and sent to the test system for analysis.

In some embodiments, test system 102, ITC 104, and/or a related entity (e.g., a baseline module) may be configured to generate a baseline or normal behavior profile for NSUT 112. For example, a baseline module may analyze live traffic over a time period to identify baseline or "normal" behavior. In this example, "normal" behavior data may include a set of measurements associated with throughput and/or processing or other values for identifying outliers (e.g., unusual values). In some embodiments, a baseline behavior profile may include threshold values for allowing normal divergence of one or more data points. In some embodiments, a baseline behavior profile may be usable by ITC 104 and/or another entity for determining abnormal or unexpected behavior or performance during testing.

In some embodiments, generating a baseline behavior profile may include decoding portions of network packet traffic to examine inline telemetry information therein and using that information to generate the baseline behavior profile. For example, test system 102, ITC 104, and/or a related entity (e.g., a baseline module) may identify sequence numbers from header portions of packets and use that information to determine a drop ratio. In this example, test system 102, ITC 104, and/or a related entity (e.g., a baseline module) may identify timestamps from packets and use that information to identify latency and/or jitter. In another example, test system 102, ITC 104, and/or a related entity (e.g., a baseline module) may identify hop counts from packets and use that information to determine route availability or related metrics.

In some embodiments, test system 102, ITC 104, and/or a related entity (e.g., an impairment scheduler) may be configured to generate and/or maintain a schedule of days/times when a particular impairment or impairment test can be implemented. For example, an impairment scheduler may be manually configured by a network operator such that a given impairment test involving live traffic or flows can only be executed on Sundays between the hours of 9 pm and 11 pm.

In some embodiments, test system 102, ITC 104, and/or a related entity (e.g., an impairment scheduler) may be configured to determine or define impairment test execution windows based on a prior analysis of live traffic (e.g., during a baselining phase). For example, an impairment scheduler may determine that a particular impairment test can only be executed during periods where packet or traffic volumes satisfy some threshold criteria (e.g., when traffic is between 30% and 60% of a maximum bandwidth). In another example, an impairment scheduler may define impairment test execution windows based on a prior analysis of live traffic such that a particular impairment test can only be executed during periods where certain traffic types (e.g., packet flows associated with a particular application service, such as Netflix) or certain mixes of packet traffic is present. In another example, an impairment scheduler may define impairment test execution windows based on a prior analysis of live traffic such that a particular impairment test can only be executed during periods where a particular network congestion event is detected or occurring.

It will be appreciated that FIG. 1 is for illustrative purposes and that various nodes, their locations, and/or their functions described above in relation to FIG. 1 may be changed, altered, added, or removed. For example, some nodes and/or functions may be combined into a single entity.

Figure 2:
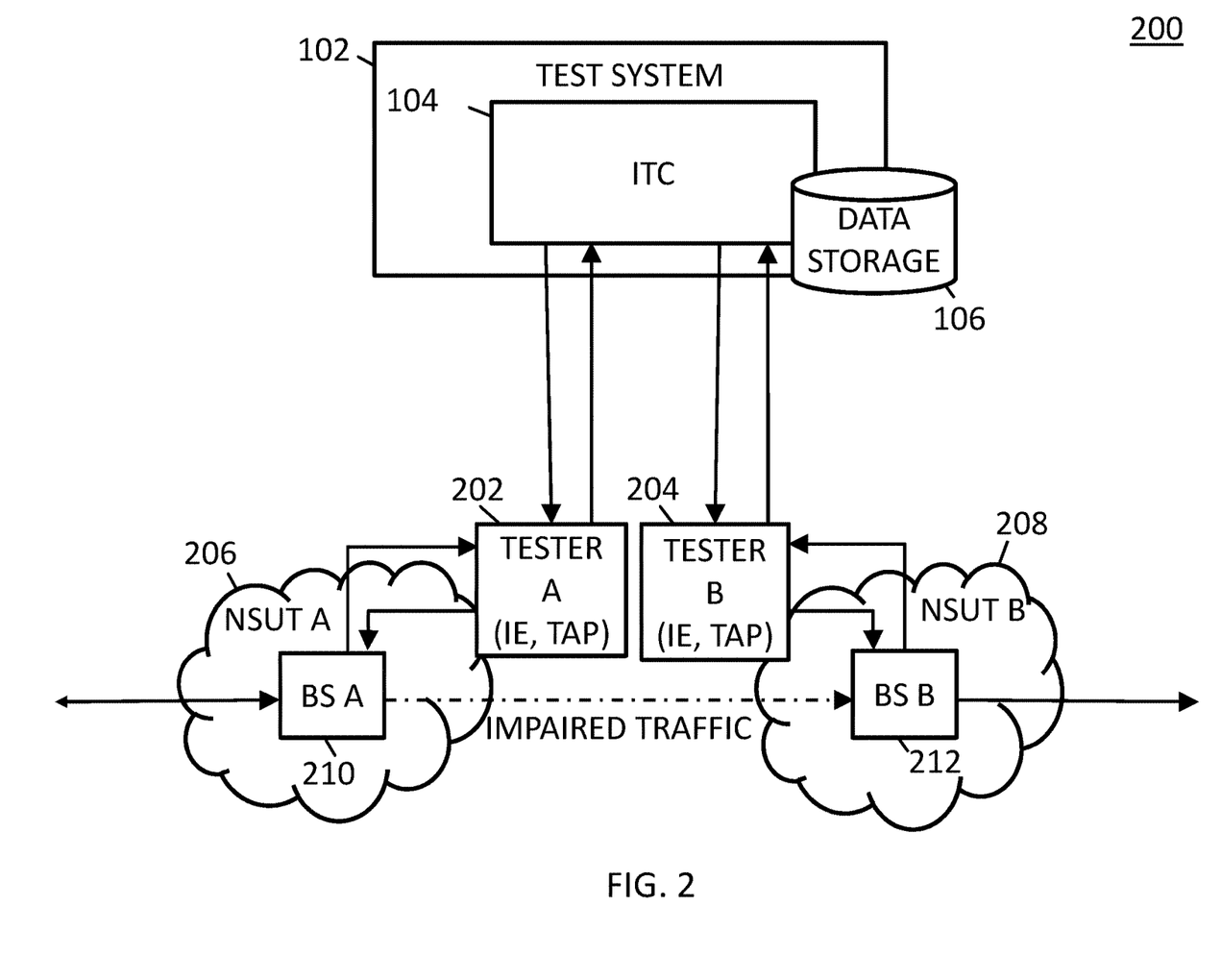
FIG. 2 is a diagram illustrating an example distributed test environment for indirect testing using impairment rules.

FIG. 2 is a diagram illustrating an example distributed test environment 200 for indirect testing using impairment rules.

Referring to FIG. 2, environment 200 may include multiple, distributed testers 202-204 (e.g., physical or virtual IEs with monitoring functionality) and ITC 104 for controlling or instructing testers 202-204. In some embodiments, each of testers 202-204 may perform functions similar to that previously described with respect to IE 106 and tap 114.

In some embodiments, tester 202 may be located inline with NSUT 206, e.g., tester 202 may be located between at least one traffic source (e.g., tester 204) and NSUT 206. For example, BS 210 may divert network traffic to tester 206, tester 206 may impair at least some of the traffic using relevant impairment rules (e.g., received from ITC 104); and tester 206 may then send the network traffic, including the impaired traffic, onward to NSUT 206 via BS 212.

In some embodiments, tester 204 may be located inline with NSUT 208, e.g., tester 204 may be located between at least one traffic source (e.g., tester 202) and NSUT 208. For example, BS 212 may divert network traffic to tester 206, tester 206 may impair at least some of the traffic using relevant impairment rules (e.g., received from ITC 104); and tester 206 may then send the network traffic, including the impaired traffic, onward to NSUT 208 via BS 212.

In some embodiments, test system 102 and/or ITC 104 may communicate with testers 202-204 via one or more communications interfaces and/or protocols. For example, using an IP or HTTP protocol, ITC 104 may provide each of testers 202-204 with similar or different impairment rules for effecting traffic impairments on traffic headed to a respective NSUT and, using a REST API or other protocol, each of testers 202-204 may send traffic portions intended for, coming from, or associated with NSUT 206 and NSUT 208.

In some embodiments, test system 102, ITC 104, and/or related entities may be configured for directing or controlling indirect testing involving a plurality of NSUTs, e.g., NSUT 206 and NSUT 208. For example, NSUT 206 may represent a first WAN and NSUT 208 may represent a second, different WAN. In this example, once a baseline behavior profile is generated for NSUTs 206-208, commands or other information (e.g., impairment rules, scheduling rules, and/or test related configuration information) may be communicated to testers 202-204 associated with NSUT 206 and NSUT 208 for instructing them on which impairments to apply, when to apply the impairments, and/or for how long to apply the impairments.

In some embodiments, ITC 104 may be configured to communicate with testers 202-204 or elements therein to observe and perform behavioral baselining processing and/or related functions. For example, each of testers 202-204 may be located within a respective NSUT and may include monitoring functionality (e.g., a physical or virtual tap or probe) for copying and/or sending traffic portions to ITC 104 for behavioral baselining processing.

In some embodiments, testers 202-204 may be configured to communicate with one or more nodes, e.g., BS 210 or BS 212, in a respective NSUT for monitoring and/or other purposes. For example, BS 210 may be configured for sending and/or diverting live traffic to tester 202. In this example, tester 202 may modify or impair the traffic received from BS 210 and then send the impaired traffic back to BS 210 where BS 210 sends the impaired traffic through NSUT 206 and/or to NSUT 208. In this example, BS 212 may receive impaired traffic from NSUT 206 and may send the impaired traffic to tester 204 where tester 204 can process the impaired traffic and/or send test related information to tester system 102 or ITC 104 for analysis. In another example, BS 212 may be configured for sending and/or diverting live traffic to tester 204. In this example, tester 204 may modify or impair the traffic received from BS 212 and then send the impaired traffic back to BS 212 where BS 212 sends the impaired traffic through NSUT 208 and/or to NSUT 206. In this example, BS 210 may receive impaired traffic from NSUT 208 and may send the impaired traffic to tester 202 where tester 202 can process the impaired traffic and/or send test related information to tester system 102 or ITC 104 for analysis.

In some embodiments, ITC 104 may be configured to communicate with testers 202-204 or elements therein to observe and obtain test related data from NSUT 206 and NSUT 208. For example, each of testers 202-204 may be located within a respective NSUT and may include monitoring functionality (e.g., a physical or virtual tap or probe) for copying and/or sending traffic portions to ITC 104. In this example, tester 202 may receive (e.g., with or without help from BS 210) traffic sent to NSUT 206 and provide the traffic or portions thereof to ITC 104 and tester 204 may receive (e.g., with or without help from BS 212) traffic sent to NSUT 208 and provide the traffic or portions thereof to ITC 104.

In some embodiments, test system 102, ITC 104, and/or a related entity (e.g., a correlation module) may be configured to monitor and analyze test related data. For example, a correlation module associated with test system 102 may compare test data and an expected performance (e.g., based on a baseline) and may report the results to a test operator and/or other entity. In some embodiments, test system 102, ITC 104, and/or a related entity (e.g., a correlation module) may be configured to dynamically interact with testers 202-204 during a test. For example, test system 102, ITC 104, and/or a related entity (e.g., a correlation module) may detect issues (e.g., a large deviation from expected or baseline behavior during a test) from received test data from testers 202-204 and, in response, test system 102, ITC 104, and/or a related entity (e.g., a correlation module) may instruct testers 202-204 to modify, stop or throttle back the test. In another example, prior to testing and/or during testing, test system 102, ITC 104, and/or a related entity (e.g., a correlation module) may provide test configuration information that instructs testers 202-204 to monitor traffic and detect test issues and how to modify or adjust testing based on the detected test issues, e.g., the test configuration information may include thresholds for implementing alternate or variations of test plans.

It will be appreciated that FIG. 2 is for illustrative purposes and that various nodes, their locations, and/or their functions described above in relation to FIG. 2 may be changed, altered, added, or removed. For example, some nodes and/or functions may be combined into a single entity.

Figure 3:
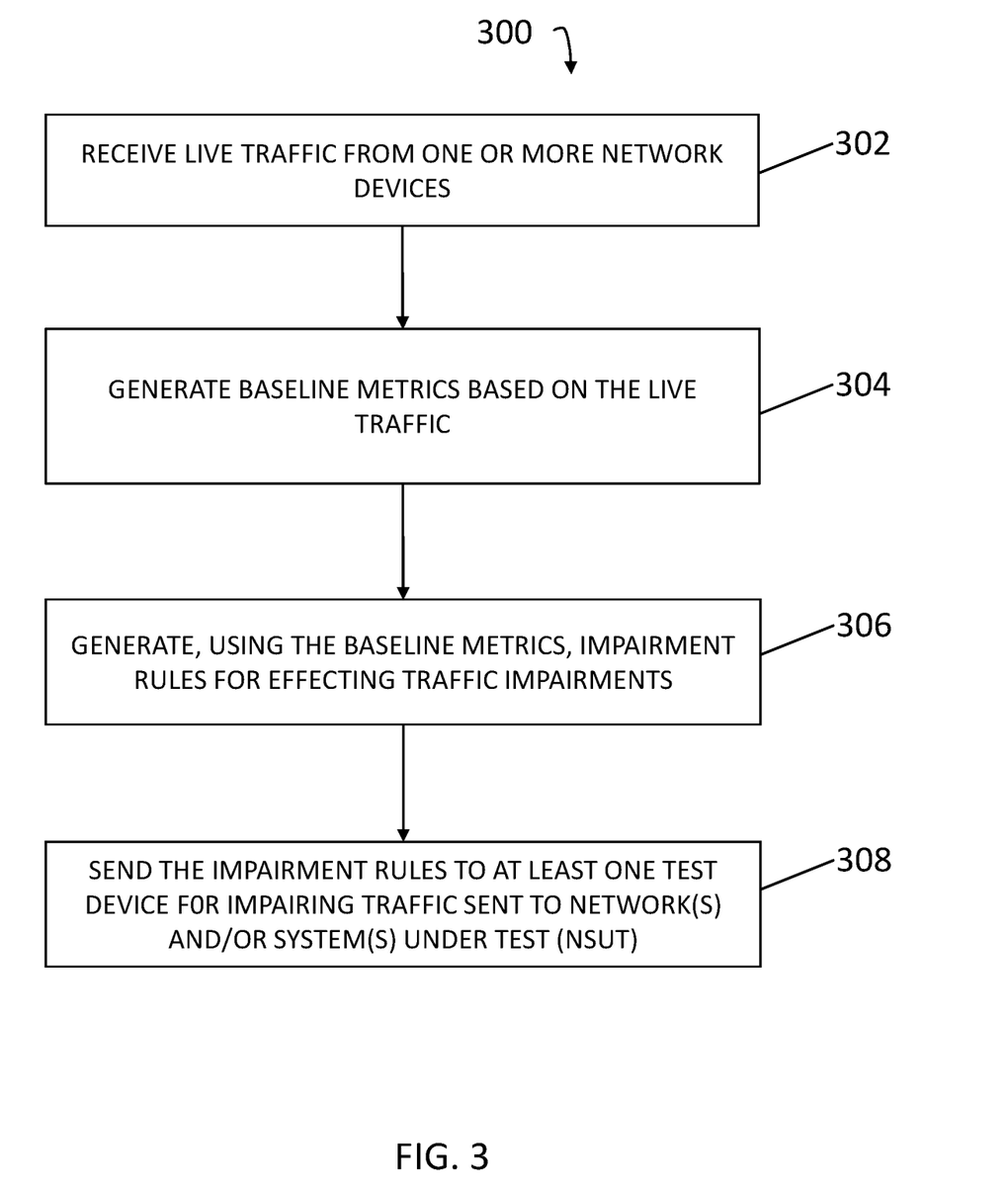
FIG. 3 is a diagram illustrating an example process for generating impairment rules.

FIG. 3 is a diagram illustrating an example process 300 for generating impairment rules. In some embodiments, example process 300, or portions thereof, may be performed by or at test system 102, a test device, ITC 104, IE 106, and/or another node or module.

In step 302, live traffic from one or more network devices may be received. For example, ITC 104 may be configured to receive, via BS 110, live traffic directed to NSUT 112 for baseline inspection and/or related processing.

In step 304, baseline metrics may be generated based on the live traffic. For example, ITC 104 or a related entity (e.g., a baseline module) may generate a baseline profile or related metrics associated with observed traffic.

In this example, the baseline profile or related baseline metrics may indicate a normal behavioral profile or traffic pattern associated with NSUT 112.

In some embodiments, generating baseline metrics may include decoding at least some portions of live traffic to obtain inline telemetry information, e.g., sequence numbers, timestamps, and/or data.

In step 306, impairment rules for effecting traffic impairments may be generated using the baseline metrics.

In step 308, the impairment rules may be sent to at least one test device for impairing traffic sent to the NSUT.

In some embodiments, additional or updated impairment rules may be generated periodically or aperiodically using updated baseline metrics from recent live traffic received by the test controller. In such embodiments, the additional or updated impairment rules may be sent periodically or aperiodically to one or more test devices.

It will be appreciated that example process 300 is for illustrative purposes and that different and/or additional actions may be used. It will also be appreciated that various actions described herein may occur in a different order or sequence.

Figure 4:
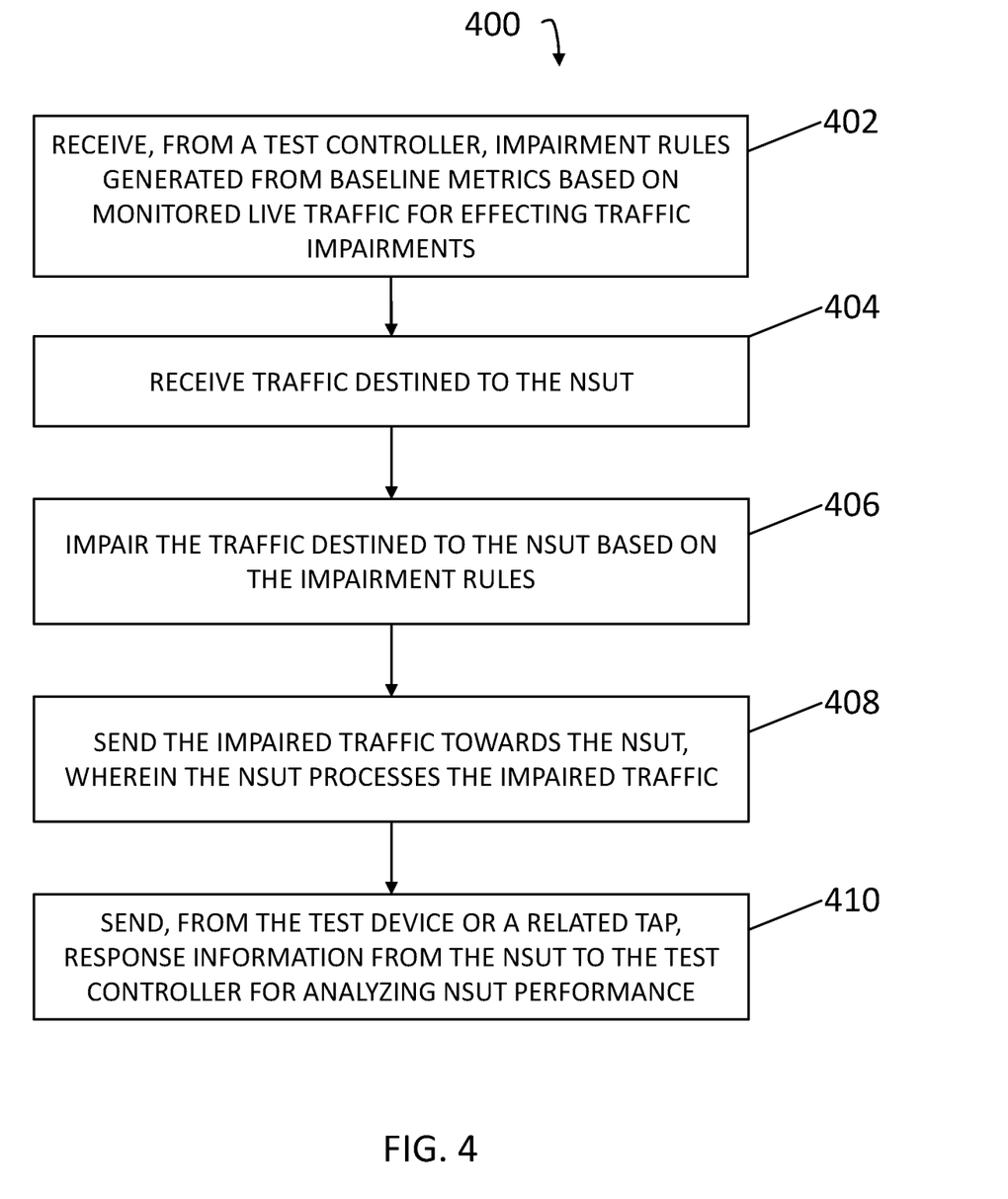
FIG. 4 is a diagram illustrating an example process for indirect testing using impairment rules.

FIG. 4 is a diagram illustrating an example process 400 for indirect testing using impairment rules. In some embodiments, example process 400, or portions thereof, may be performed by or at test system 102, tester 202, tester 204, a test device, ITC 104, IE 106, and/or another node or module.

In step 402, impairment rules generated from baseline metrics based on monitored live traffic may be received from a test controller. For example, IE 106 may receive impairment rules from ITC 104 for impairing traffic directed to NSUT 112. In another example, tester 202 may receive impairment rules from ITC 104 for impairing traffic directed to NSUT 206.

In step 404, traffic destined to the NSUT may be received. For example, BS 110 may divert live network traffic to IE 106. In another example, BS 210 may divert live network traffic to tester 202.

In step 406, traffic destined to the NSUT may be impaired based on the impairment rules. For example, IE 106 may use impairment rules to impair traffic directed to NSUT 112. In another example, tester 202 may use impairment rules to impair traffic directed to NSUT 206.

In step 408, the impaired traffic may be sent towards the NSUT, wherein the NSUT processes the impaired traffic. For example, IE 106 may send impaired traffic to NSUT 112 via BS 110. In another example, tester 202 may send impaired traffic to NSUT 206 via BS 110 In step 410, response information from the NSUT may be sent, from the test device or a related tap, to the test controller for analyzing NSUT performance. For example, IE 106 may receive response traffic from NSUT 112 via BS 110, e.g., the response traffic may be generated in response to NSUT 112 receiving and processing impaired traffic. In another example, tester 202 may receive response traffic from NSUT 206 via BS 210, e.g., the response traffic may be generated in response to NSUT 206 receiving and processing impaired traffic.

In some embodiments, impairment rules may impair traffic by increasing jitter, increasing delay, increasing packet drops, modifying packets to include invalid or inaccurate information, or reordering packets. For example, jitter or latency may be artificially introduced to one or more flows that are traversing IE 106 or tester 204, packet header information may be manipulated, packets may be dropped, or packets may be buffered and re-ordered for (re)transmission.

In some embodiments, impairing traffic based on impairment rules may be performed dynamically or at one or more predetermined times. For example, IE 106 or tester 204 may query a data store containing a plurality of impairment rules using traffic characteristics (e.g., an IP 5-tuple) and may use a relevant impairment rule to add jitter or latency to the traffic.

In some embodiments, analyzing NSUT performance may include receiving data about a NSUT from a plurality of sources, wherein the plurality of sources includes a test device; correlating the data and an expected response based on baseline metrics and the impairment rules utilized; and generating a report regarding NSUT performance based on correlation results. For example, ITC 104 or a related entity (e.g., a correlation module) may compare impairment test data and expected baseline performance and may generate a report indicating how NSUT handled impairment and/or whether the actual results were significantly different (e.g., greater than or less than a predefined threshold value) than the expected results.

In some embodiments, a plurality of sources for sending data about a NSUT may include a second test device, a probe, a network switch, a bypass switch, or a monitoring device external to a test controller and/or a first test device. For example, tester 202 may send impair traffic to NSUT 206 and traffic from NSUT 206 may traverse tester 204. In this example, tester 204 may include probe or monitoring functionality and may send response data associated with impaired traffic to test system 102 or ITC 104 for analysis and/or processing.

It will be appreciated that example process 400 is for illustrative purposes and that different and/or additional actions may be used. It will also be appreciated that various actions described herein may occur in a different order or sequence.

It should be noted that test system 102, ITC 104, tester 202, tester 204, and/or functionality described herein may constitute a special purpose computing device. Further, test system 102, ITC 104, tester 202, tester 204, and/or functionality described herein can improve the technological field of testing networks and/or systems by providing mechanisms for impairing live or real-world traffic and monitoring how the impaired traffic is handled. For example, a test system may include ITC 104 that can generate impairment rules to modify or impair existing or real-world (e.g., non-test) traffic so as to mimic real-world or unpredictable conditions and can send or distribute these impairment rules to one or more test devices, e.g., at different sites or networks. In this example, a test device can use the impairment rules to impair received traffic that is destined for NSUT 112. Continuing with this example, the test device or a related entity (e.g., a probe of the test system) may monitor and send traffic egressing NSUT 112 to ITC 104 and ITC 104 can analyze the traffic to determine performance of NSUT 112 or related effects.

The subject matter described herein for indirect testing using impairment rules improves the functionality of test platforms and/or test tools by impairing real-world traffic and monitoring effects on NSUT 112. It should also be noted that a computing platform that implements subject matter described herein may comprise a special purpose computing device (e.g., a network device test device) usable to perform indirect testing using impairment rules.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for indirect testing using impairment rules, the method comprising:
    at a first test device located inline between at least one non-test traffic source and a network and/or system under test (NSUT) comprising at least one physical node or device, the first test device being implemented using at least one processor and at least one memory, wherein the first test device is physically separate from the NSUT:
        receiving, from a test controller, impairment rules generated from baseline metrics associated with a baseline behavior profile based on monitored live traffic for effecting traffic impairments;
        receiving, from the at least one non-test traffic source and via a bypass switch, live, non-test network traffic destined to the NSUT;
        impairing the live, non-test network traffic destined to the NSUT based on the impairment rules;
        sending, via the bypass switch, the impaired traffic towards the NSUT, wherein the NSUT processes the impaired traffic;
        sending, from the first test device or a related tap, response information from the NSUT to the test controller for analyzing NSUT performance;
        monitoring how the NSUT handles the impaired live traffic by receiving traffic and/or related data from the NSUT; and
        comparing the received information to the baseline behavior profile or to an expected behavior profile derived from the baseline behavior profile.

2. The method of claim 1 wherein the impairment rules impair the live, non-test network traffic by increasing jitter, increasing delay, increasing packet drops, modifying packets to include invalid or inaccurate information, or reordering packets.

3. The method of claim 1 wherein impairing the live, non-test network traffic based on the impairment rules is performed dynamically or at one or more predetermined times.

4. The method of claim 1 comprising:
    at the test controller and prior to the first test device receiving the impairment rules:
        receiving live traffic from one or more network devices;
        generating the baseline metrics based on the live traffic;
        generating, using the baseline metrics, the impairment rules for effecting traffic impairments; and
        sending the impairment rules to at least the first test device for impairing traffic sent to the NSUT.

5. The method of claim 4 wherein generating baseline metrics includes decoding at least some portions of the live traffic to obtain inline telemetry information.

6. The method of claim 4 wherein additional or updated impairment rules are generated periodically or aperiodically using updated baseline metrics from recent live traffic received by the test controller.

7. The method of claim 6 wherein the additional or updated impairment rules are received periodically or aperiodically from the test controller.

8. The method of claim 1 wherein analyzing NSUT performance comprises:
    receiving data about the NSUT from a plurality of sources, wherein the plurality of sources includes the first test device;
    correlating the data and an expected response based on the baseline metrics and the impairment rules utilized; and generating a report regarding NSUT performance based on correlation results.

9. The method of claim 8 wherein the plurality of sources includes a second test device, a probe, a network switch, the bypass switch, or a monitoring device external to the test controller.

10. A system for indirect testing using impairment rules, the system comprising:
at least one processor;
at least one memory; and
a first test device located inline between at least one non-test traffic source and a network and/or system under test (NSUT) comprising at least one physical node or device, wherein the first test device is implemented using the at least one processor and the at least one memory, wherein the first test device is physically separate from the NSUT, wherein the first test device is configured for:
receiving, from a test controller, impairment rules generated from baseline metrics associated with a baseline behavior profile based on monitored live traffic for effecting traffic impairments;
receiving, from the at least one non-test traffic source and via a bypass switch, live, non-test network traffic destined to the NSUT;
impairing the live, non-test network traffic destined to the NSUT based on the impairment rules;
sending, via the bypass switch, the impaired traffic towards the NSUT, wherein the NSUT processes the impaired traffic;
sending, from the first test device or a related tap, response information from the NSUT to the test controller for analyzing NSUT performance;
monitoring how the NSUT handles the impaired live traffic by receiving traffic and/or related data from the NSUT; and
comparing the received information to the baseline behavior profile or to an expected behavior profile derived from the baseline behavior profile.

11. The system of claim 10 wherein the impairment rules impair the live, non-test network traffic by increasing jitter, increasing delay, increasing packet drops, modifying packets to include invalid or inaccurate information, or reordering packets.

12. The system of claim 10 wherein impairing live, non-test network traffic based on the impairment rules is performed dynamically or at one or more predetermined times.

13. The system of claim 10 comprising:
the test controller configured for:
prior to the first test device receiving the impairment rules:
receiving live traffic from one or more network devices;
generating the baseline metrics based on the live traffic;
generating, using the baseline metrics, the impairment rules for effecting traffic impairments; and
sending the impairment rules to at least the first test device for impairing traffic sent to the NSUT.

14. The system of claim 13 wherein the test controller is configured for periodically or aperiodically generating, using updated baseline metrics from recent live traffic received by the test controller, additional or updated impairment rules.

15. The system of claim 14 wherein the additional or updated impairment rules are received periodically or aperiodically from the test controller.

16. The system of claim 10 wherein the test controller is configured for analyzing NSUT performance by:
receiving data about the NSUT from a plurality of sources, wherein the plurality of sources includes the first test device;
correlating the data and an expected response based on the baseline metrics and the impairment rules utilized; and
generating a report regarding NSUT performance based on correlation results.

17. The system of claim 16 wherein the plurality of sources includes a second test device, a probe, a network switch, the bypass switch, or a monitoring device external to the test controller and/or the first test device.

18. A non-transitory computer readable medium comprising computer executable instructions embodied in the computer readable medium that when executed by at least one processor of a computer perform steps comprising:
at a first test device located inline between at least one non-test traffic source and a network and/or system under test (NSUT) comprising at least one physical node or device, the first test device being implemented using at least one processor and at least one memory, wherein the first test device is physically separate from the NSUT:
receiving, from a test controller, impairment rules generated from baseline metrics associated with a baseline behavior profile based on monitored live traffic for effecting traffic impairments;
receiving, from the at least one non-test traffic source and via a bypass switch, live, non-test network traffic destined to the NSUT;
impairing the live, non-test network traffic destined to the NSUT based on the impairment rules;
sending, via the bypass switch, the impaired traffic towards the NSUT, wherein the NSUT processes the impaired traffic;
sending, from the first test device or a related tap, response information from the NSUT to the test controller for analyzing NSUT performance;
monitoring how the NSUT handles the impaired live traffic by receiving traffic and/or related data from the NSUT; and
comparing the received information to the baseline behavior profile or to an expected behavior profile derived from the baseline behavior profile.

19. The non-transitory computer readable medium of claim 18 wherein the impairment rules impair the live, non-test network traffic by increasing jitter, increasing delay, increasing packet drops, modifying packets, or reordering packets to include invalid or inaccurate information.

20. The non-transitory computer readable medium of claim 18 comprising:
at the test controller and prior to the first test device receiving the impairment rules:
receiving live traffic from one or more network devices;
generating the baseline metrics based on the live traffic;
generating, using the baseline metrics, the impairment rules for effecting traffic impairments; and
sending the impairment rules to at least the first test device for impairing traffic sent to the NSUT.

* * * * *